US010225515B1

(12) United States Patent
Sun et al.

(10) Patent No.: US 10,225,515 B1
(45) Date of Patent: Mar. 5, 2019

(54) INFORMATION HANDLING SYSTEM SLIDING DISPLAY AND CAMERA ARRANGEMENT

(71) Applicant: Dell Products L.P., Round Rock, TX (US)

(72) Inventors: Cecilia H. Sun, Austin, TX (US); Paul J. Doczy, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 15/880,644

(22) Filed: Jan. 26, 2018

(51) Int. Cl.
*H04N 7/14* (2006.01)
*G06F 1/16* (2006.01)
*H04N 7/15* (2006.01)
*H04N 5/232* (2006.01)
*H04N 5/225* (2006.01)

(52) U.S. Cl.
CPC ........... *H04N 7/142* (2013.01); *G06F 1/1616* (2013.01); *H04N 5/2252* (2013.01); *H04N 5/2256* (2013.01); *H04N 5/23241* (2013.01); *H04N 5/23293* (2013.01); *H04N 7/15* (2013.01)

(58) Field of Classification Search
CPC .. H04N 7/142; H04N 5/2252; H04N 5/23293; H04N 5/2256; H04N 7/15; H04N 5/23241; H04N 2007/145; G06F 1/1616
USPC ........................................ 348/14.02
See application file for complete search history.

(56) References Cited

U.S. PATENT DOCUMENTS

| | | | |
|---|---|---|---|
| 2003/0171133 A1* | 9/2003 | Mizuta ............... | G06K 9/00013 455/550.1 |
| 2009/0075692 A1* | 3/2009 | Park .................... | H04M 1/0233 455/556.1 |
| 2018/0113487 A1* | 4/2018 | Ebey .................... | G06F 3/1423 |

* cited by examiner

*Primary Examiner* — Stella L. Woo
(74) *Attorney, Agent, or Firm* — Zagorin Cave LLP; Robert W. Holland

(57) ABSTRACT

A portable information handling system selectively slides a display integrated in a housing relative to the housing to expose and cover a camera integrated in the housing behind the display. For example, upon execution of a videoconferencing application, an actuator slides the display to expose the camera to support a videoconference, and after the videoconference application completes, the display slides to cover the camera, thus providing security against unauthorized viewing through the camera, which is physically blocked from receiving light.

19 Claims, 5 Drawing Sheets

INFORMATION HANDLING SYSTEM SLIDING DISPLAY AND CAMERA ARRANGEMENT

BACKGROUND OF THE INVENTION

Field of the Invention

The present invention relates in general to the field of information handling system displays, and more particularly to an information handling system display and camera arrangement.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Portable information handling systems offer a communication tool that supports audiovisual communication. Generally portable information handling systems integrate a display for presenting visual information as visual images, a speaker for presenting audio information as audible noises, processing components that execute applications to generate visual and audible information, an internal power source to power the processing components, and wireless networking devices to communicate the visual and audio information with external information handling systems. Once example of such an information handing system is a portable telephone built in a planar housing that communicates with a cellular telephone wireless wide area network to support telephone calls and videoconferencing. Larger tablet or all-in-one information handling systems typically operate similarly to mobile telephones, although larger systems tend to relay on WiFi for communication instead of cellular networks. More complex portable information handling systems, such as laptops with a clamshell or portable configuration, often run the same audiovisual communication applications as smaller tablet systems. Generally, clamshell and convertible information handling systems have two separate housing portions rotationally coupled to each other with a hinge. One housing portion integrates a keyboard that accepts keyed inputs and the other housing portion integrates the display so that rotating the housing portions 90 degrees relative to each other holds the display in a raised position over the keyboard. Integrating a keyboard reduces portability of the information handling system, however, end users tend to find more complex input tasks easier to perform with a keyboard that has movable keys.

Generally, portable information handling systems include a camera near the display so that an end user face is captured by the camera when viewing the display. Such an arrangement conveniently allows the end user to engage in video conferences with the integrated camera while viewing the display and having the keyboard available to make keyed inputs. In many enterprises, portable information handling systems have replaced desktop systems for employees, basically giving employees a portable office that supports conferences on the go wherever Internet interfaces are available. Employees often engage in meetings where multiple participants videoconference into the meetings from remote locations. During a videoconference, employees may exchange documents and presentations through a network interface to fully share meeting materials.

Although integrated cameras offer a powerful tool in a collaborative environment, an unauthorized access of the camera will expose an end user to security risk. For example, a hacker who accesses the camera through an illicit network interface can turn on the camera and view the end user without the end user's knowledge. Some end users will place tape or other material over the camera lens as insurance against illicit viewing. Some information handling systems include a manual cover that an end user engages when not using the camera and slides aside when using the camera. Such manual systems are inelegant and inconvenient to use. End users tend to prefer that the display extend to the housing bezel so that the display footprint is efficiently used. Also, enterprises generally cannot count on end user's engaging manual blocking devices for security purposes.

SUMMARY OF THE INVENTION

Therefore, a need has arisen for a system and method which automates information handling system camera operation to prevent unauthorized access of the camera.

In accordance with the present invention, a system and method are provided which substantially reduce the disadvantages and problems associated with previous methods and systems for integrating a camera into a portable information handling system. A display integrated in an information handling system housing slides between a first position that covers a camera integrated in the housing and a second position that exposes the camera. In one embodiment, an actuator automatically exposes the camera when a video conferencing application executes and covers the camera when the videoconferencing application closes.

More specifically, a portable information handling system processes information with processing components disposed in a portable housing, such as a central processing unit (CPU) that executes instructions, memory that stores instructions and a graphics processor unit (GPU) that converts information to pixel values for presentation as visual images at a display. The display couples to the housing in a sliding relationship to move relative to the housing and a camera integrated in the housing. In a first position, the display covers the camera to block capturing of visual images by the camera. In a second position, the display exposes the camera so that the camera can capture visual images, such as of an individual looking at the display. In one example embodiment, an actuator automatically slides the display between the first and second positions based upon a predetermined condition, such as execution of a videoconferencing application at the information handling system that uses the camera. In another example embodiment, the display has a translucent material that allows light to pass through to the camera, such as infrared light, so that the camera captures filtered light when covered by the display, such as infrared light to determine distances of objects from the display.

The present invention provides a number of important technical advantages. One example of an important technical advantage is that an information handling system camera is selectively disabled when not in use to reduce the security risk of an illicit camera access by an unauthorized network attack. Sliding the display to expose the camera provides a clear visual cue for the end user that the camera is active while covering the camera with the display provides protection against illicit viewing with the information handling system in a normal viewing configuration. Integrating the camera under a sliding display allows the display to fully extend to the housing bezel so that housing footprint is efficiently used.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

A portable information handling system selectively slides a display relative to a housing to expose and cover a camera integrated in the housing. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
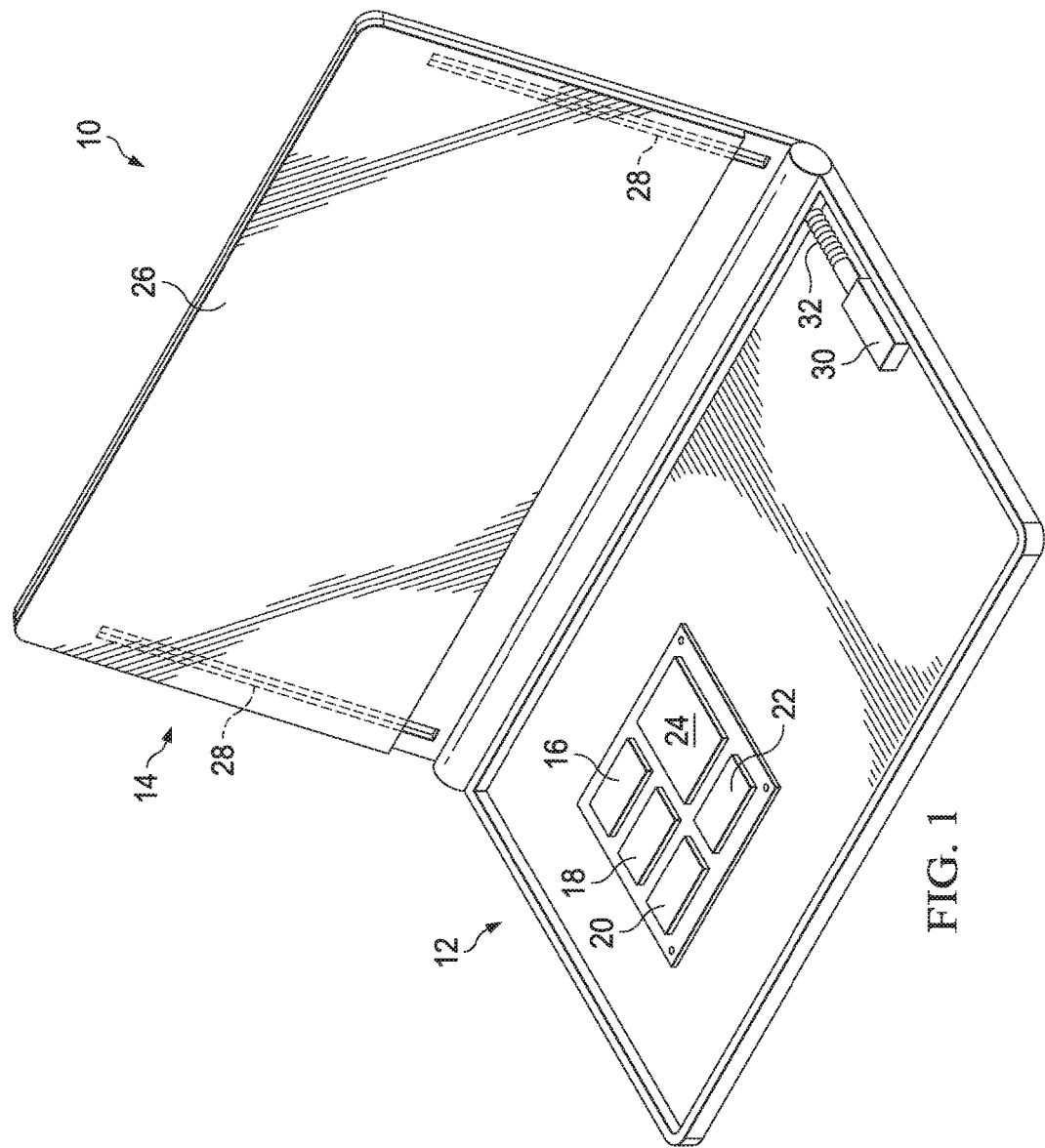
FIG. 1 depicts a side perspective view of a portable information handling system having a moveable display that selectively covers a camera.

Referring now to FIG. 1, a side perspective view depicts a portable information handling system 10 having a moveable display 26 that selectively covers a camera. In the example embodiment, information handling system 10 has a convertible configuration with a main housing portion 12 rotationally coupled to a lid housing portion 14 to rotate the housing portions relative to each other between closed and open positions. In the depicted open "clamshell" configuration, lid housing portion 14 rotates approximately 90 degrees relative to main housing portion 12 so that display 26 is held in a viewing position over top of main housing portion 12. Rotating housing portions 12 and 14 relative to each other provides alternative positions, such as a closed configuration with display 26 proximate to main housing 12 or a tablet configuration rotated 360 degrees from the closed configuration to expose display 26 facing outward with main housing portion 12 proximate to lid housing portion 14.

In the example embodiment, information handling system 10 processes information with processing components disposed in main housing portion 12. For example, a central processing unit (CPU) 16 executes instructions in cooperation with random access memory (RAM) 18, which stores the instructions and information. For instance, CPU 16 executes an operating system and applications that process end user inputs and present visual information as visual images on display 26. A chipset 20 includes a variety of processing elements and embedded code stored in flash memory that coordinates interactions with CPU 16, such as accepting inputs from a touchscreen, display, mouse and/or network interface card, and providing the inputs to CPU 16. A graphics processor unit (GPU) 24 interfaces with CPU 16 to accept visual information for processing into pixel values that display 26 applies to present visual images. A solid state drive (SSD) 24 provides persistent storage of information when power is off at information handling system 10, such as storage of the operating system and applications.

In the example embodiment, display 26 slides vertically within lid housing 14 on a display track 28 disposed on opposing sides of lid housing 14. During normal operations, display 26 is raised to a first position within lid housing 14 that provides a narrow bezel appearance to an end user. The narrow bezel provides visual images out to the perimeter of lid housing portion 14 for an improved end user viewing experience. More specifically, display 26 does not have to provide room along its perimeter to allow integration of a camera and/or microphone. Instead, when an application executing on CPU 16 needs access to visual information captured by a camera, such as a videoconferencing application, display 26 slides downward along display tracks 28 to expose the camera. In the example embodiment, an actuator 30, such as a solenoid or muscle wire, moves display 26 between a first position that covers the camera and a second position the exposes the camera. A biasing device 32, such as a spring, biases display 26 upwards to return to the first position when actuator 30 releases display 26 from the second position. In one example embodiment, an embedded controller in chipset 20 automatically commands actuator 30 to the second position when an application needs the camera, such as if a videoconferencing or picture taking application is opened, and automatically commands actuator 30 to the first position when the application no longer needs the camera.

Figure 2:
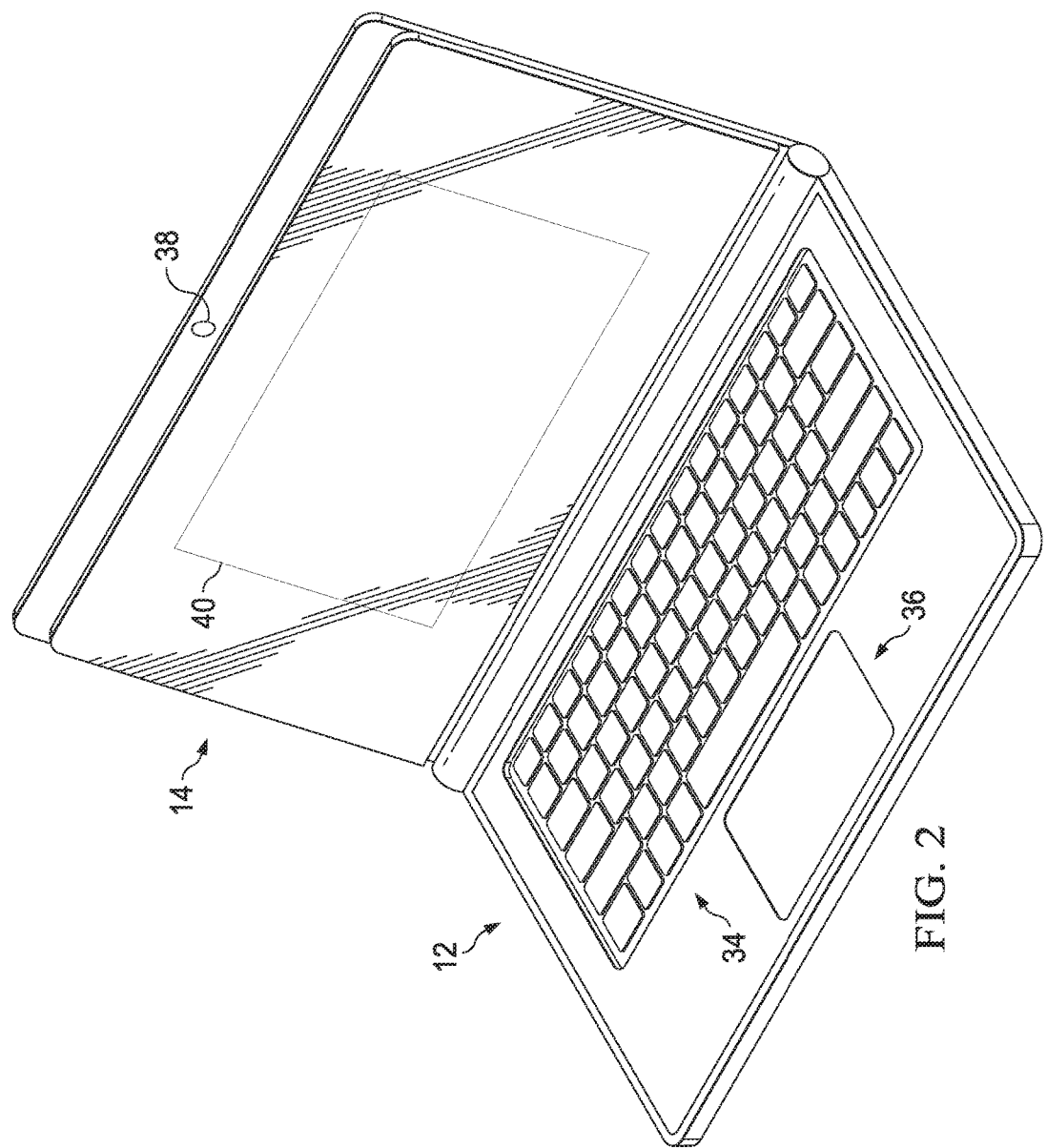
FIG. 2 depicts a side perspective view of the portable information handling system having the display slid to a position that exposes the camera.

Referring now to FIG. 2, a side perspective view depicts portable information handling system 10 having the display 26 slid to a position that exposes the camera 38. In the example embodiment, display 26 is a liquid crystal display (LCD) having a planar construction that slides parallel to lid housing portion 14. Information handling system 10 is in a clamshell configuration with a keyboard 34 and touchpad 56 arranged for end user inputs while an end user views information on display 26. Camera 38 is exposed to capture visual images of a viewing position in front of display 26, such as from where an end user would view a videoconferencing application window presented at display 26. In the example embodiment, display 26 slides downward by approximately a half inch to expose camera 38 integrated at the perimeter of lid housing portion 14. For instance, at the bottom of lid housing portion 14 display 26 slides over a region not in an end user's normal viewing, such as proximate a hinge mechanism that rotationally couples the housing portions.

Figure 3:
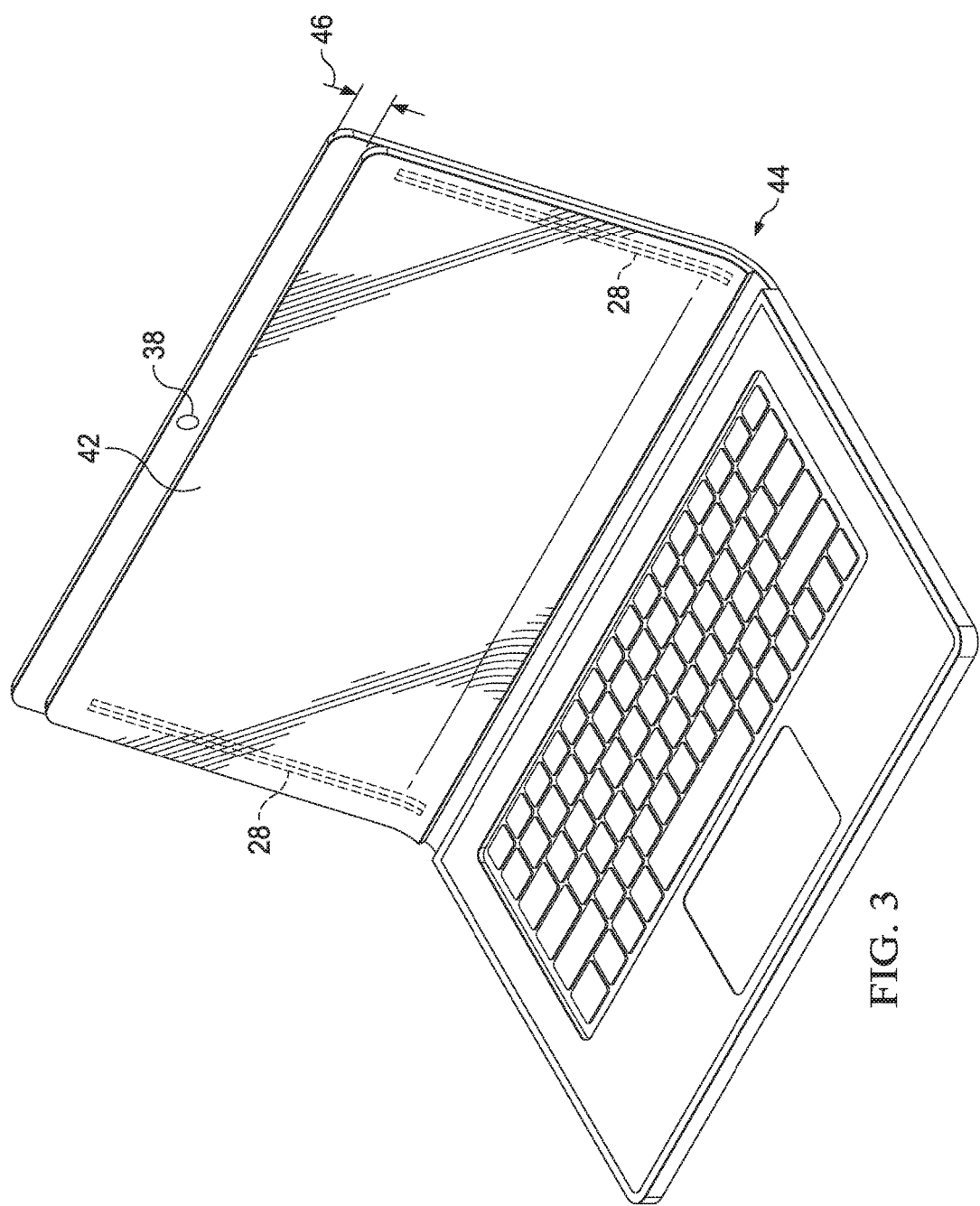
FIG. 3 depicts a side perspective view of the portable information handling system configured with an OLED display that folds when slid to expose the camera.

Referring now to FIG. 3, a side perspective view depicts the portable information handling system 10 configured with an OLED display panel 42 that folds when slid to expose camera 38. OLED films generate visual images with application of current to OLED material defining red, green and blue pixels. The thin film material generates illumination directly so that the underlying backlight structure typically used with LCDs is not needed. Thus, rather that sliding as a planar flat element parallel to lid housing portion 14, OLED display panel 42 folds to follow a path into an opening at the base of main housing portion 12. In the example embodiment, sliding movement of OLED panel 42 provides an exposed space 46 along the top edge of lid housing portion 14 so that camera 38 may capture visible light of the viewing area in front of display 42. In one alternative embodiment, a second OLED display film is integrated in exposed space 46 and interfaced with GPU 22 to present visual information when exposed by downward sliding of OLED display film 42. For example, an OLED display film integrated in lid housing portion 14 below OLED display film 42 includes an opening through which camera 38 captures visible light while the secondary display film presents visual images that cooperate with the visual images of the main OLED display film 42. When an end user completes use of camera 38. OLED display film 42 slides upward to cover the secondary display film and camera 38 as discussed above. Although the secondary display is described with respect to the OLED film embodiment, a similar display may be integrated under an LCD panel. The secondary display in one example embodiment presents visual information that supports interactions with a video conferencing application, such as a display or audio volume control panel, a contacts list, or a status presentation for the underlying videoconference application.

Figure 4:
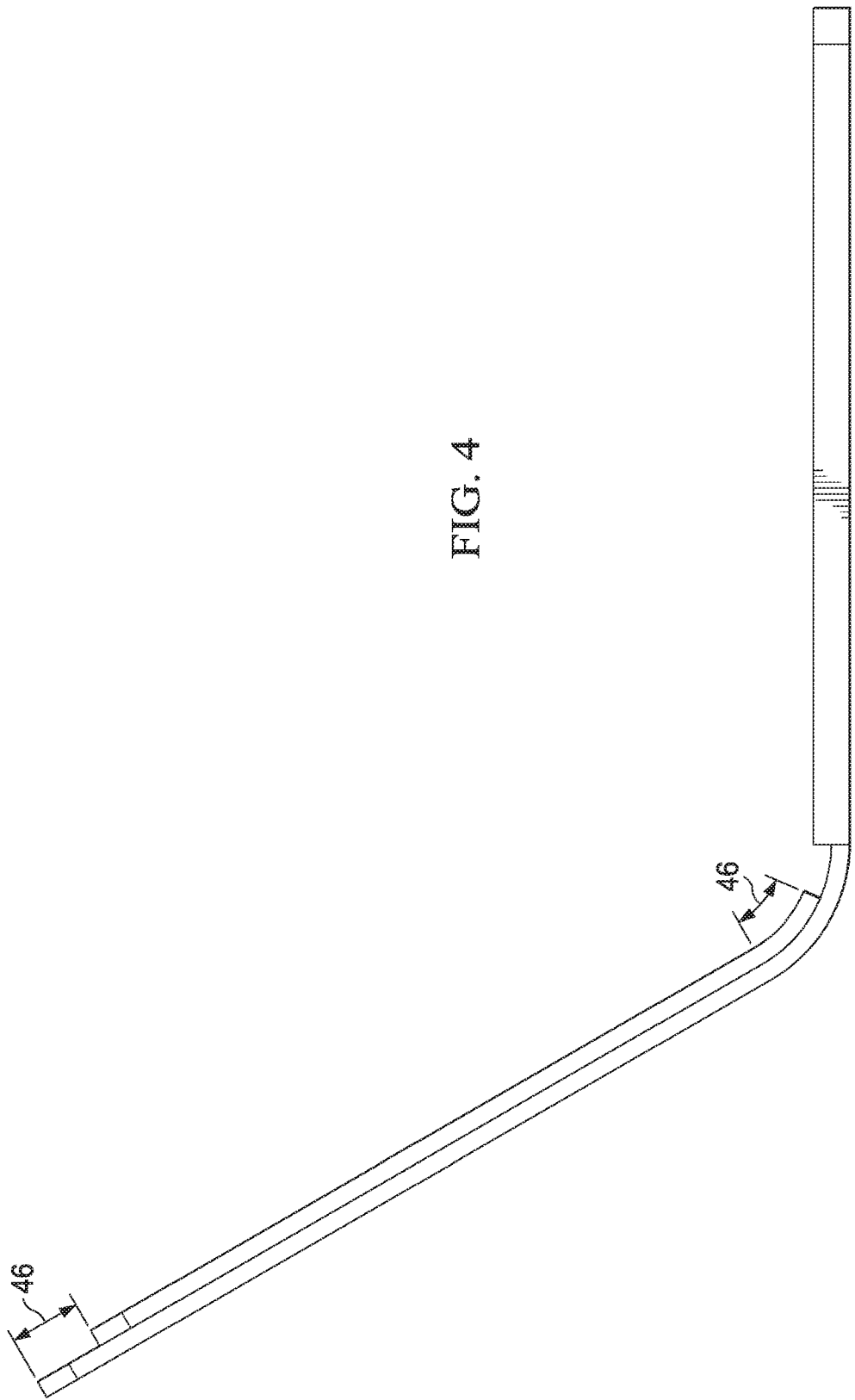
FIG. 4 depicts a side view of the portable information handling system having the OLED display folded relative to the housing.

Referring now to FIG. 4, a side view depicts portable information handling system 10 having the OLED display 42 folded relative to the housings 12 and 14. OLED display film 42 slides downward to expose area 46 at the upper perimeter of lid housing portion 14 with a corresponding sliding motion at the lower perimeter of lid housing portion 14. OLED display film 42 may fold and slide across the upper surface of main housing portion 12 or may insert into an opening of main housing portion 12. In one embodiment, OLED display film 42 has a translucent characteristic that allows light to pass through to camera 38 when display 42 slides upwards to cover camera 38. For example, camera 38 may receive infrared light through display 42 while display 42 covers camera 38, such as may be used to accept structured light for detecting objects. In one embodiment, a filter on the back of display 42 aligns over camera 38 when display 42 slides to cover camera 38 so that light other than infrared light is filtered from passing through to camera 38. In this manner, an end user has increased security against unauthorized viewing of visible light when display 42 slides to cover camera 38, however, camera 38 remains available for object detection functions. In one embodiment, when display 42 slides to the closed position, power is cutoff from camera 38 to reduce power consumption and further increase security against unauthorized viewing through camera 38.

Figure 5:
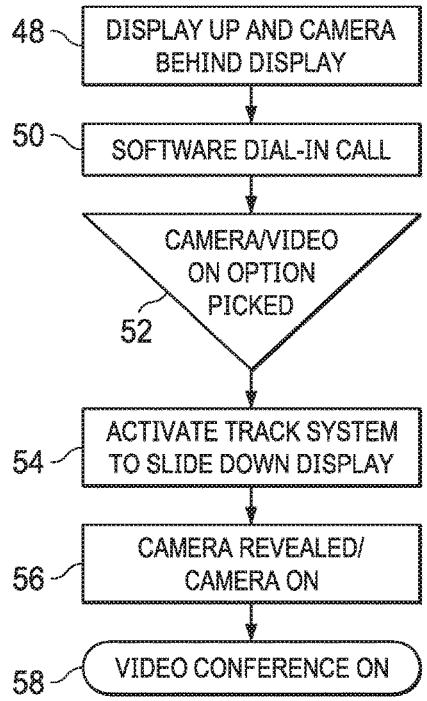
FIG. 5 depicts a flow diagram of a process for automatically sliding a display to expose a camera at execution of a videoconferencing application.

Referring now to FIG. 5, a flow diagram depicts a process for automatically sliding a display to expose a camera at execution of a videoconferencing application. The process starts at step 48 with a display slid to an upward position that covers camera 38. At step 50, a software based dial-in is detected that indicates a request for a videoconference. Although the example embodiment relates to videoconferencing, in alternative embodiments, alternative triggers may be monitored to initiate camera selection. At step 52, a determination is made of whether a camera option for the videoconference is enabled. In one example embodiment, an end user is presented with a user interface to approve sliding motion of the display before sliding motion is initiated. If the camera option is enabled, the process continues to step 54 to activate the display tracking system that slides the display relative to the housing. At step 56, sliding of the display reveals the camera from underneath the display to capture visible light for the area in front of the display, such as where an end user will watch the videoconference. At step 58, the video conference is initiated with the camera capturing visual images of the end user.

Figure 6:
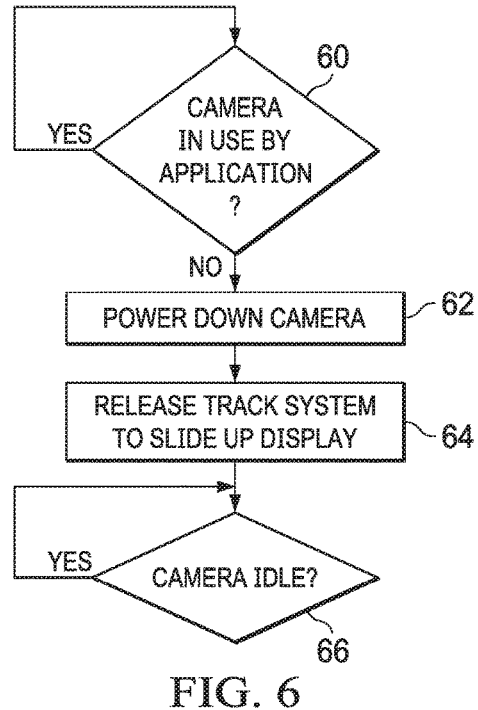
FIG. 6 depicts a flow diagram of a process for automatically sliding the display to cover the camera upon closing of the videoconferencing application.

Referring now to FIG. 6, a flow diagram depicts a process for automatically sliding the display to cover the camera upon closing of the videoconferencing application. The process starts at step 60 with monitoring of the videoconferencing application, such as with a state machine executing on an embedded controller. Upon detection of completion of the end user of the camera, such as by detection of closing of the videoconferencing application, the process continues to step 62 to power down the camera. At step 64, the display tracking system is released to slide the display from a position that exposes the camera to a position that covers the camera. Once the camera is covered by the display, the process continues to step 66 monitor the camera in an idle state. Upon detection of a request for the camera, such as by a reopening of the videoconferencing application, the tracking system slides the display to expose the camera and the process returns to step 60.

Although the present invention has been described in detail, it should be understood that various changes, substitutions and alterations can be made hereto without departing from the spirit and scope of the invention as defined by the appended claims.

What is claimed is:

1. An information handling system comprising:
a main housing portion;
a lid housing portion rotationally coupled to the main housing portion, the main and lid portions rotating relative to each other between open and closed positions;
processing components disposed in the main housing portion and cooperating to process information;
a camera integrated in the lid housing portion and interfaced with the processing components, the camera capturing visual information and communicating the visual information to the processing components; and a display integrated in the lid housing portion and sliding within the lid housing portion between a first position that exposes the camera and a second position that covers the camera.

2. The information handling system of claim 1 further comprising:

an actuator integrated in the information handling system and coupled to the display, the actuator sliding the display from the second position to the first position in response to a predetermined condition.

3. The information handling system of claim 2 further comprising:

a biasing device coupled to the actuator and the display, the biasing device biasing the display towards the second position.

4. The information handling system of claim 3 wherein the predetermined condition comprises selection of a videoconferencing application by an end user, the actuator sliding the display to the first position upon the selection of the videoconferencing application.

5. The information handling system of claim 4 wherein the biasing device returns the display from the first position to the second position in response to closing of the videoconferencing application.

6. The information handling system of claim 5 wherein the display comprises a liquid crystal display that slides parallel to the lid housing portion.

7. The information handling system of claim 5 wherein the display comprises an organic light emitting diode display that folds under a part of the main housing portion when sliding from the second to the first position.

8. The information handling system of claim 1 wherein the camera powers off if the display is in the second position and powers on if the display is in the first position.

9. The information handling system of claim 8 further comprising:

a secondary display integrated in the housing lid portion behind the fir display, the secondary display presenting visual information when the first display is in the first position.

10. A method for presenting visual information at an information handling system, the method comprising:

presenting visual images at a display integrated in a housing of the information handling system, the display covering a camera integrated in the housing;

detecting a predetermined condition at the information handling system; and in response to the detecting, sliding the display relative to the housing to expose the camera from behind the display, the camera aligned to capture visual images of an area aligned to view the display.

11. The method of claim 10 further comprising:
detecting removal of the predetermined condition; and
in response to the detecting removal, sliding the display relative to the housing to cover the camera.

12. The method of claim 11 further comprising:
powering down the camera when the display covers the camera; and
powering up the camera when the display slides to expose the camera.

13. The method of claim 10 further comprising:
enabling only infrared light sensing at the camera if the display covers the camera; and
enabling visual light sensing at the camera if the display exposes the camera.

14. The method of claim 13 wherein the display comprises an OLED display.

15. The method of claim 10 further comprising:
integrating a second display in the housing proximate the camera, the second display covered by the first display when the first display covers the camera; and
in response to the sliding the fir display to expose the camera, presenting visual information with the second display.

16. The method of claim 10 wherein:
the predetermined condition comprises execution of a videoconferencing application; and
the sliding further comprises actuating a solenoid to move the display relative to the housing.

17. A system for presenting visual information, the system comprising:

a housing configured to hold a display in a sliding relationship;

a display integrated in the housing;

a camera integrated in the housing and covered by the display; and an actuator coupled to the display and the housing, the actuator sliding the display relative to the housing between a first position having the camera covered by the display and a second position exposing the camera from underneath the display;

wherein the display comprises an OLED, the camera scanning only for infrared light in the first position and for both visible and infrared light in the second position.

18. The system of claim 17 wherein the actuator automatically actuates the display to the second position in response to execution of a videoconferencing application.

19. The system of claim 17 further comprising a secondary display covered in the first position and exposed in the second position.

* * * * *

UNITED STATES PATENT AND TRADEMARK OFFICE
CERTIFICATE OF CORRECTION

PATENT NO. : 10,225,515 B1
APPLICATION NO. : 15/880644
DATED : March 5, 2019
INVENTOR(S) : Cecilia H. Sun and Paul J. Doczy It is certified that error appears in the above-identified patent and that said Letters Patent is hereby corrected as shown below:

In the Claims

Column 7, Line 40, Claim 9 replace "fir" with --first--;
Column 8, Line 21, Claim 15 replace "fir" with --first--.

Signed and Sealed this
Twenty-third Day of April, 2019

Andrei Iancu
*Director of the United States Patent and Trademark Office*